Feb. 2, 1937.  F. J. G. NEUMANN ET AL  2,069,590
SUPPORT
Filed Dec. 3, 1934
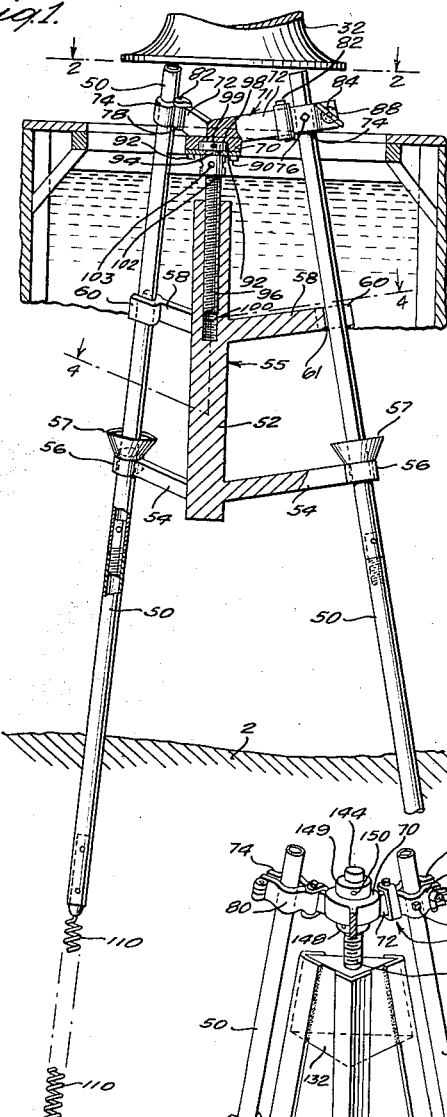
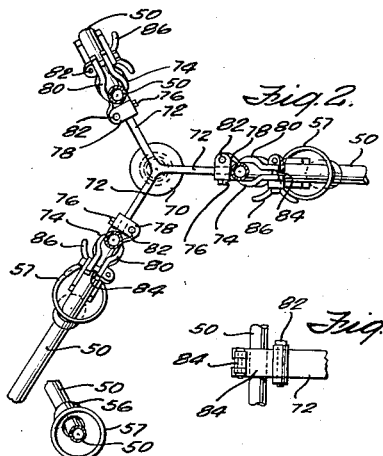
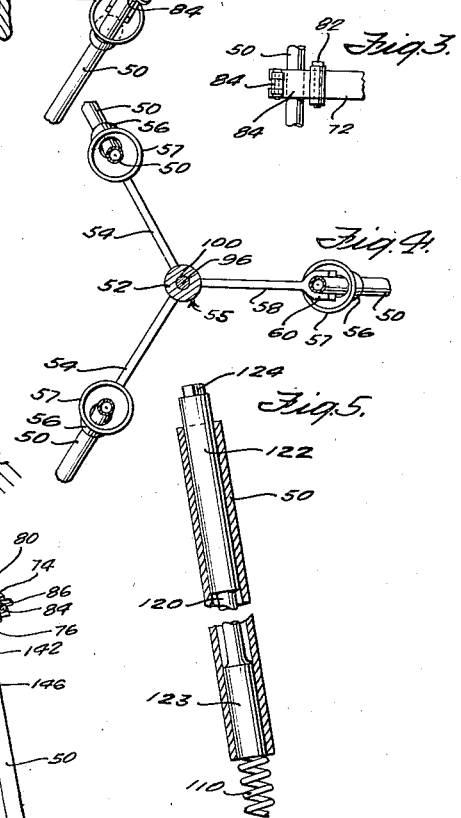
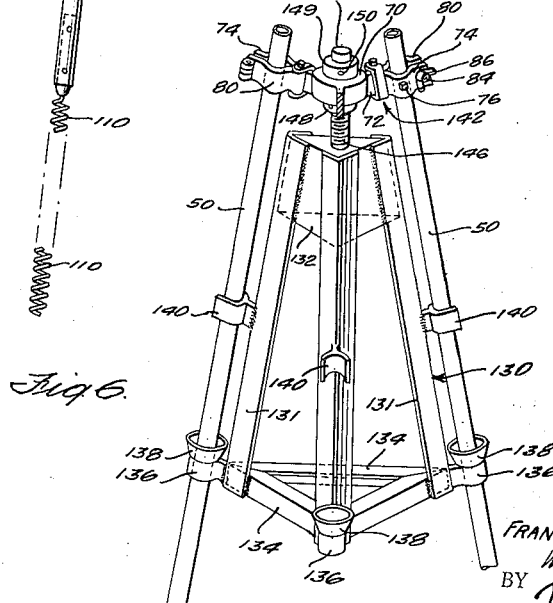
INVENTORS
FRANZ JULIUS GERHARD NEUMANN
WERNER RUDOLF HAUBOLD
BY Newell + Spencer + Safford
ATTORNEYS Patented Feb. 2, 1937

2,069,590

UNITED STATES PATENT OFFICE 2,069,590

SUPPORT

Franz Julius Gerhard Neumann and Werner Rudolf Haubold, Houston, Tex., assignors to The Salt Dome Oil Corporation, Houston, Tex., a corporation of Delaware Application December 3, 1934, Serial No. 755,739

18 Claims. (Cl. 248—163)

This invention relates to methods of and apparatus for making geophysical measurements. The invention more particularly relates to methods of and apparatus for making such measurements upon the areas of the earth's surface which are covered by water.

The methods of making geophysical measurements on land where the portion of the earth's surface upon which the geophysical instrument being used is readily accessible, are well known and understood. Such measurements have been made based on differences in the density or of the mass of the different materials, rocks, strata or other deposits in the earth's structure. Also measurements have been based on electric conductivity, magnetic qualities, radio emanations and also upon the difference in the capacity of different earth structures to propagate shock.

The torsion balance is an instrument in common use for determinations base on differences in mass. The seismograph is used to determine the rate of transmission of shock by materials of different character in the earth. For this purpose vibrations artificially produced are used. In most cases the instruments used in making these measurements must be positioned in fixed relation to the earth's structure or at least firmly or stably positioned with respect thereto. Particularly with instruments of the type of the torsion balance and the seismograph in which the parts are delicately mounted, it is necessary that the instrument be so firmly or stably supported and held with respect to the earth's surface that accidental movement thereof shall be prevented. It also is necessary that the instrument be protected from the influence of outside forces causing jar or vibration which would produce error in the reading or prevent accurate observations being made. In the use of such instruments on land it has been possible to take such precautions without difficulty.

The use of geophysical instruments and the making of geophysical measurements upon areas of the earth's surface covered by water heretofore have been attended with such difficulty as to have prevented extensive making of measurements of this kind in such areas. We are aware that heretofore it has been proposed to mount a geophysical instrument on a pile driven into a penetrable bottom underlying a body of water. It has been found, however, that geophysical instruments mounted on piles are subjected to serious errors due to forces acting upon the instrument which are the result of the motion of the water caused by currents or by the wind as well as to the wind itself. A pile or a group of piles upon which a geophysical instrument may be supported is subject to the wave action which may produce forces of such amount as to cause movement or vibration or jar of the instrument which will entirely prevent readings of sufficient accuracy to be of scientific or commercial value. Moreover, when such supports or piles are positioned in currents of water, forces of like character may act upon the piles and may be transmitted to the instrument with equally deleterious effect. The effect of wind frequently is more severe when it blows across open water and the errors of observation and recording of the instrument may be produced in greater degree from this cause than is usual upon land; also it is more difficult to protect the instrument from the force of the wind by suitable housing unless an expensive structure and one not easily portable is erected upon the piles. Furthermore, a pile is unwieldy and heavy and difficult both to fasten in the underlying bottom, and after obtaining the readings to remove therefrom and to transport to a new position.

The present invention is concerned with a method of and apparatus for making geophysical measurements upon areas of the earth's surfaces covered by water, which areas, therefore, are not readily accessible for positioning the instrument with respect to the earth in the usual manner.

It also is an object of the invention to provide apparatus for carrying out the method of making these observations and of such construction as will prevent the entrance of substantial or undesirable error in the observations or readings or recordings of the instruments.

It is a further object of our invention to provide apparatus for carrying out these methods of making geophysical measurements which will be readily portable upon or over the surface of the water and which, without difficulty, may be positioned with respect to the earth's surface at the point where it is desired to make the measurements.

It is a further object of our invention to provide a readily demountable support for the geophysical instrument which may be readily assembled and may be fixedly and firmly positioned with respect to the earth.

The invention comprises means which may be utilized with a float or floating vessel or with a transportable platform upon which the observer or operator may work in setting the support and in mounting the instrument thereon, as well as in making the observations. This platform, however, as disclosed in our copending application, Serial No. 713,852, filed March 3, 1934, of which the present application is a continuation in part, may be so constructed as to shield the support for the geophysical instrument from the action of the water and from the action of the waves or of the wind causing the waves, and so as to prevent the forces of the wind and of the current or wave action from reaching the instrument itself. As described in said prior application, we may form in such a float or platform an opening providing a space extending downwardly toward the bottom underlying the body of water, through which space may be passed the support for the geophysical instrument which is the subject of the present invention so that said support may be positioned with its lower end fixed in the earth bottom and with its upper end extending above the water level formed within the space or opening. The support of the invention is so constructed that upon it the geophysical instrument may be easily mounted by the observer or workman.

The invention, therefore, contemplates a support for contacting with or for being firmly fixed in the earth bottom and of a form to position the geophysical instrument mounted thereon at or above the water level of the body of water covering the area of the earth's surface being surveyed, and particularly one suitable for use with the shield for preventing or reducing the forces of the water and waves reaching the support and the instrument, as disclosed in said prior application, Serial No. 713,852.

The invention further contemplates a particular construction of the support for the geophysical instrument which may be readily inserted fixedly in place with respect to the earth underlying the body of water, may be readily demounted or collapsed and transported to a new location, and may be positioned and mounted from a platform or from a float or other vessel without the necessity of apparatus such as a pile driver. Moreover, the support of our invention is of such construction that the desired rigidity for support of the geophysical instrument and the firm contact with the underlying surface of the earth is secured. The construction of the support of our invention is also such that a considerable amount of accidental shock and jar or other disturbance due to external forces may reach the support without causing displacement or disturbance thereof, or disturbance of the instrument itself such as will introduce undesirable error. This construction comprises struts of material which may be somewhat resilient but capable of resisting substantial permanent deformation or bending and a device having parts or members cooperating to act upon said struts or surfaces thereof to produce deformation or bending or bowing thereof into strain and shock resisting relation with each other and with said device and members to produce a rigid support as a whole.

The apparatus and construction herein disclosed particularly are adapted for use in making geophysical measurements on areas of the earth's surface which are covered with water to a depth such that from the surface of the water the bottom may be reached by structures or struts which are convenient to handle and which may have their lower ends forced into the earth so as to fix the strut with respect to the earth while extending up through the water to a point adjacent the surface so that the geophysical instrument may be supported thereon.

While the invention is not limited to particular depths of water and while, especially when used with a shield against wave action and against water currents as well as against wind, as described in said application, Serial No. 713,852, it may be utilized within practical limits regardless of the depth of water, in general we consider that our invention, in the particular form herein disclosed, has particular application in depths of water from about 2 to 20 feet. Bodies of water having a depth of 2 feet or greater, and particularly when exposed in open extents to the force of the wind, may develop considerable wave action and the support must be as rigid as possible and capable of being firmly fixed in the bottom. Moreover, in order to secure readings over a sufficiently large area of the earth's surface the apparatus must be readily transportable. We therefore have devised a construction for a support which may be handled from a vessel or from a float. In depths of water, however, extending to say 20 or 30 feet it is still possible to reach the bottom with struts for support of the instrument, which struts may be driven into or otherwise fixed in the bottom by working from a vessel or from a floating platform, provided that these struts and supports are suitably constructed.

The invention provides a support which may be used in any depth of water in which it is possible to reach the bottom with a member in the form of a strut and comprises a frame or structure which may be assembled in place or in some cases may be set after assembly. The depth of the water in which the support is to be assembled or is to be set and the question of convenience or the cost of handling may determine which method is to be adopted. We have provided in this support, however, for fixing the lower ends of the strut members thereof in the earth bottom underlying the body of water and for securing a high degree of rigidity of the structure of the support, so as to reduce the possibility of disturbance of the instrument by exterior forces. Moreover, the construction of the support may be such that it may easily be assembled without the use of particular apparatus and the strut members thereof may be fastened into the earth bottom with the use of hand tools only.

The invention will be more clearly understood from the following description taken in connection with the drawing in which Figure 1 shows the vertical section of the support for a geophysical instrument;

Figure 2 shows a plan view at lines 2—2 of Figure 1;

Figure 3 shows a detail of the construction of the support of Figure 1;

Figure 4 shows a section on line 4—4 of Figure 1;

Figure 5 shows a modified form of the leg of the support of Figure 1; and

Figure 6 shows a modified form of a portion of the device.

In Figure 1 is shown a vertical section through the support of our invention. The legs 50, of which three are utilized in the particular embodiment illustrated, may be made of pipes. In this particular embodiment these pipes may be of about 2" nominal pipe size, having an outside diameter of about 2⅜". As will be understood from further description of the device, the legs 50 are driven into or otherwise fixedly positioned in the earth bottom 2 underlying the body of water and are inclined to each other and converge upwardly toward each other. As may be seen from Figures 2 and 4 they are spaced apart, symmetrically in the particular arrangement illustrated, around a common axis.

In a vertical position generally coincident with said axis is provided a shaft or elongated hub 52 from which project two sets of arms, said sets being spaced apart along said shaft or hub, and in each set an arm extends generally laterally from the axis toward each of the three pipes, said arms being spaced about the hub 52 to form a rigid spider member in each set. Adjacent the lower end of the shaft 52 the arms 54 project in an upwardly inclined direction to connect said shaft with three collars 56 provided with funnel-like portions 57. These collars have holes therethrough somewhat larger than the outside diameter of the pipes 50. The arms 54 of this lower or first rigid spider member hold these collars 56 in such position that the axis of the holes therethrough has the same general inclination in which it is intended that the pipes of the tripod shall become positioned when fixed in the earth bottom and held in proper position to support the base of the geophysical instrument 32.

The upper set of arms 58 are similarly rigidly connected to the shaft or elongated hub 52 to form an upper or second rigid spider member and extend in a slightly upwardly inclined direction to jaws or clevis pieces 60. These clevis pieces 60, which may be open at the outside portions thereof as shown in Figure 1, form guides through which the pipes may be slid when inserting them in position, as will be hereafter described. The arms 54 and 58 and the shaft or hub 52 form a rigid frame or rigid member 55 which, it will be clear from a consideration of the drawing and the above description, may be held by the three pipes extending through the collars 56, the outermost portion of the inner surface of the hole of the collar bearing against the outermost surfaces of the respective pipes 50, the clevises 60 sliding along the pipes until further movement is arrested by the collars 56 resting against the pipes. On the other hand, the frame may be lifted in a direction of the axis of the shaft 52 until the collars are substantially clear of the pipes 50. If held in such position by some means, as hereafter described, the pipes 50 may be slid lengthwise thereof through the open space of the clevises 60 and through the openings in the collars 56.

In Figure 1 at 70 is shown a hub having connected thereto, to form a second rigid member or frame or third spider 71, arms 72 extending outwardly from the hub 70 thereof to engage the pipes 50. In the embodiment of our invention illustrated in Figures 1 and 2 these arms 72 are formed adjacent their outer ends with portions 74 extending part way around the pipes 50. Also rigidly fastened to the arms 72 by suitable fastening means 76 are hinge bearings 78 having hinge pieces 80 pivoted therein upon hinge pins 82. The hinge pieces 80 may, therefore, be swung away from the pipes 50, or, again, may be swung against the pipes 50 into a generally parallel position to the portion 74 of the arms 72. The hinge pieces 80 have pivoted adjacent their outer ends swing bolts 84 upon which may be screwed wing nuts 86. In the portion 74 of the arms 72 which contact the pipes 50, a slot 88 is provided in which the swing bolt 84 may be slipped when the hinge piece 80 is to be clamped around the pipes 50 and the wing nuts 86 may then be screwed up to bind the pipes 50 between the portions 74 of the arms 72 and said hinge pieces 80.

The hub 70 is provided with a flange 90 fastened by means of bolts or other fasteners 92 to the hub 70. The hub 70 is so formed as to provide a recess behind the flange 90 when the flange 90 is fastened thereto, the flange 90 having a hole therethrough through which may pass the shank 94 of a jackscrew 96. Fastened by means of a pin 99 to the shank 94 of the jackscrew 96 is a collar 98 fitting within the recess of the hub 70. The shank 94 and the collar 98 fastened thereon are free to turn in this recess with the turning motion of the jackscrew 96 upon its axis. Thus it will be seen that the jackscrew is held in operable relation with the frame or spider 71 provided by the hub 70 and the arms 72 so as to receive the thrust of the jackscrew in an upward direction while holding the jackscrew from dropping out of engagement with the spider. In the shaft or hub 52 is cut a thread 100 fitting to the thread of the jackscrew 96. Also fastened upon the shank 94 of the jackscrew or forming an integral part thereof is a collar 102 having holes 103 therein to receive a wrench bar for the purpose of turning the jackscrew on its axis.

It will be clear from a consideration of Figure 1 that when the jackscrew 96 is screwed out of the thread 100 in the shaft 52 the collar or flange 98 will be moved upwardly against the inner wall of the recess in the hub 70 and the hub 70 will be moved away from the frame 55 formed by the arms 54 and 58 connected to the shaft 52. On the other hand, if the spider 71 is held in a fixed position the frame 55 will be moved away from the spider 71 when the jackscrew 96 is screwed out of the thread 100. Reverse movements of the parts will be secured by opposite turning motion applied to the jackscrew 96.

If the spider 71 is clamped upon the legs 50 by the hinge pieces 80 held by the clamping force of the wing nuts 86 and swing bolts 84, then upon turning the jackscrew 96 out of the thread 100 the arms 54 of the first spider will be forced downward in a direction axially of the shaft 52. The inner surface of the outer portion of the collars 56 will move into contact with the outer portions of the respective pipes and further turning motion of the jackscrew 96 will cause these collars to bear hard upon these pipes. Because of the inclination of the pipes and of the inner surfaces of the collars and because the motion applied to the collars is in a direction parallel to the axis of the shaft 52, a jamming or wedging action of the collars upon the pipes 50 will occur. As the spider formed by collars 56, the arms 54 and the shaft or hub 52 are parts of the rigid frame 55, further motion of the frame 55 is stopped upon wedging of the collars upon the pipes 50. The pipes are rigidly gripped by the spider and are held in fixed and rigid connection with each other at the portion of the length thereof contacted by the collars 56. As the upper ends of the pipe 50 are rigidly held in the third spider 71 and as the shaft 52 and the jackscrew 96 form a stiff connection between the spider 71 and the frame 55 including the arms 54 and the collars 56, the whole support thus becomes a rigid unit. When the lower ends of the pipes 50 are suitably fixed in the earth bottom underlying the water, a firm and rigid support is thus provided for the geophysical instrument mounted upon the upper ends of the structure and one which will withstand the forces caused by motion of the water either due to currents or wave action and one which will withstand the shock which may be accidentally applied thereto by contact with the float, by the workmen's tools or from other external sources.

It will now be understood that when the pipes 50 are made of resilient material such as iron or steel, which is capable of being bent or bowed but, because of the character of the material itself and of the cross-sectional form thereof, offers substantial resistance to permanent deformation, the pipes in their deformed position and shape become stiffened throughout their length or a substantial portion thereof and combine their respective rigidities with that of the frame 55 to produce a rigid support or tripod capable of resisting motion thereof under impact or shock. The invention, therefore, comprises a set of struts of such material and of such form as to be capable of being resiliently deformed into shapes which become substantially rigid and which cooperate with rigid means to maintain said deformed rigid shape. The construction is such that particularly when the ends of the pipes are driven into or firmly fixed in the earth the reformation or bend of the pipes produce a structure capable of great rigidity and firmness.

In order fixedly to position the pipes in the earth bottom underlying the body of water, we may drive the pipes into penetrable material in said bottom to a depth sufficient to secure a rigid and firm support for these pipes. It is important in using some geophysical instruments, such as the seismograph, to insure that an intimate and firm contact with the earth is secured in order that the artificially generated earth shock may be properly transmitted to the instrument through the structure. In some cases in order to secure the desired firmness and contact with the earth, we have found that it is desirable to drive or otherwise force the legs or struts, especially when using pipes such as those described above, into the solid earth bottom underlying the water to a depth of 3 to 4 feet. We have so devised our support that we may drive these pipes to any desired depth and may form the pipes or legs 50 in sections, as indicated in Figure 1, of such length as may be conveniently handled and, by coupling sections together, to provide sufficient length reaching into the firm earth bottom underlying the water.

In this connection it should be explained that in many localities a firm penetrable earth bottom underlying bodies of natural water is overlaid with a layer of silt or semi-liquid mud or ooze below the water and incapable of bearing weight or of holding a structural member in fixed position in relation to the earth bottom. Thus it is necessary in many cases not only to provide a strut which is sufficiently light in weight to be handled from the floating platform or vessel but one which must be sufficiently long to reach down through the water and through the layer of ooze and to penetrate into the earth bottom a distance sufficient to give rigid support to the strut or leg. By utilizing pipes for the struts or legs of our support we secure the desirable light weight and are able to make the legs in convenient sections which may be easily coupled together. Moreover, pipes may readily be driven into a penetrable earth floor.

We have found, however, that we may simplify the work of fixing and firmly positioning the struts or legs of the tripod or support of our invention by so constructing the legs that instead of driving them directly into the underlying earth floor they may be inserted therein by a turning motion. In order to accomplish this result we may provide at that end of each leg which is to be inserted in the earth, a screw member 110 which may be fastened to the end of the pipe 50 and may project beyond the end thereof. The screw member 110 may be formed as a helical coil. As an example of a convenient construction which may be utilized with pipes such as the 2″ pipes referred to above, we have formed the helical coil by winding a piece of steel ½″ in diameter upon an axis to form a helix having a diameter of about 2″ with a pitch of the degree of ¾″ to 1″ from one turn of the helix to an adjacent turn. There is thus formed a member similar to a corkscrew which, upon turning the pipe 50 upon its axis, will draw the pipe secured thereto downwardly into the earth as the screw member 110 is screwed into the earth. In order to effect this turning motion we find it merely necessary to turn the pipes with a Stillson wrench or with a wrench or other device of convenient type applied to the upper end of the pipes. The dimensions and proportions given above for this construction are merely examples and may be varied to suit different conditions.

While, as stated above, we may assemble the parts illustrated in and described in connection with Figures 1 to 4 inclusive prior to setting the support upon the bottom, which method of utilizing the device of our invention may be most convenient in some cases, for the most part, in view of the necessity of securing the pipes 50 at sufficient depth in the penetrable earth bottom, and in some cases at different depths, we have found it preferable to assemble the support in the position in which it is to be used. In order to secure the advantage afforded by the clevises 60 and collars 56 attached to the frame 55 to guide the pipes into the proper positions in the earth bottom, not only with respect to each other but with respect to the earth, we may temporarily support the spider 71, for example, from the float or vessel, so that it may be held in approximate working position. The arms 54 and 58 may thereby be held in a given relation to the float, the shaft 52 being suspended by the jackscrew 96 supported by the collar 98 bearing against the flange 90 of the hub 70. By so temporarily supporting the spider 71, the hinge pieces 80 may be swung upon the hinge pins 82 away from their clamping position. The pipes 50 then may be passed down through the respective clevis pieces 60 and through the respective collars 56, the funnel-like portions 57 serving to guide the pipes 50 into the collars 56 and the collars 56 and the clevis pieces 60 acting as guides to direct the end of the pipe 50 and the screw member 110 attached thereto to the proper point at the earth bottom which is in line with the collars 50, the clevises 60 and the clamping devices 74 and 80 of the spider 71.

If the helical screw member 110 is not used, the pipes may be driven directly into the earth bottom by force applied to the upper end of the pipes. Moreover, as the pipe is driven down into the earth additional sections may be added at the upper end of the pipe, it only being necessary that the coupling members be of such form as will pass down through the clevis pieces 60 and the collars 56. When, however, the screw member 110 is utilized, the pipe may be turned in the collar 56 and in the clevis 60 and thereby screwed into the earth bottom to the desired degree, further sections being added to the pipe if necessary. Combinations of driving the pipe and screwing it into the earth bottom may be used in certain cases depending upon the character of the structure of the bottom into which the pipes are to be driven.

When the pipes have penetrated to sufficient depth to give a firm and rigid support to these pipes and to position the upper ends thereof adjacent the water level, and preferably above the water level, the spider 71 may be clamped to the upper ends of these pipes by swinging the hinge members 80 into clamping position and fastening them by means of the wing nuts 86. The temporary support for the spider 71 may then be removed, the weight of the frame 55 being thereafter suspended upon the jackscrew 96. If, now, the jackscrew 96 is turned in a direction which will screw it out of the thread 100 in the shaft 52, as above described, the collars 56 will move downwardly in the direction of the shaft 52 and will bind upon the inclined pipes 50. The force thus applied will tend to draw pipes 50 inwardly toward the axis of the shaft 52, the upper ends of the pipes and the ends fixed in the earth respectively being held in fixed relation to each other. It thus will be clear that by using the downward motion of the first spider arms 54 and collars 56 it is not necessary to provide collars for the arms 58, as no bearing outwardly from the axis upon clevis pieces 60 occurs. Thus the pipes may be easily slipped into the clevis pieces.

Upon reverse movement of the screw 96 causing movement of the frame 55 toward the spider 71, the clevises 60 will bear against the pipes 50 and move the portions of the pipes which respectively are adjacent thereto outwardly from the axis of the shaft 52. As the upper ends of the pipes are fixed in the spider 71 this movement of the clevises 60 alone would cause the portions of the pipes 50 respectively passing through the collars 56, being more removed from the fixed ends of the pipes than the clevises 60, to move outwardly from said axis to a greater extent than said portions of the pipes adjacent the clevises 60. As the collars 56, however, move upwardly the same distance that the clevises 60 are moved the portions of the pipes 50 passing through the collars cannot move outwardly as far as they tend to move and the pipes thus become bowed or bent in an outwardly convex bow between the collars 56 and the rigid spider 71. The clevises 60 thus resist approach of the struts or pipes 50 and the collars 56 resist spreading of said struts. When the lower ends of the pipes are fixed in the earth in the manner shown the pipes also become bowed or bent between their lower ends and the points of contact of said pipes with the frame 55.

If the clevises 60 are placed below the collars 56, or if collars are substituted for clevises 60 in the arrangement as shown in the drawing, the downward movement may be utilized to effect bowing or bending of the pipes in an outwardly concave bow. In the latter case clevises may be substituted for the collars 56 in the position illustrated, if desired. The forces applied to the pipes through the arms 54 would then act to prevent approach of the pipes and the collars substituted for the clevises 60 would act to resist spreading of the pipes, that is, would cause approach of the pipes toward the axis of the shaft 52 and toward each other at the parts thereof adjacent the arms 58 upon downward movement of the frame 55. In utilizing either construction and movement it will be understood that the rigidity provided by frame 55 with its central shaft or hub 52 and its arms 54 and 58 is transferred to the otherwise free portions of the lengths of the pipes 50 between the upper ends thereof and the earth bottom, so that said bowed pipes and the deflecting or bowing device form a support of great rigidity. It also will be understood that the rigidity of the tripod or support is greatly increased by the bowing accomplished by the device of the invention when the lower ends of the pipes are not fixed in the earth or rigidly held with respect to each other, because of the action thereof to resist approach of the pipes at similar places on the lengths of the different pipes and to resist spreading of the pipes at other places similarly positioned on the different pipes. While in some cases the tripod construction of the invention may be desirable, used without inserting the lower ends of the pipes in the earth or otherwise fixing them at their lower ends, for the purpose of geophysical measurements, particularly in water covered areas, preferably the ends of the pipes are so fixed in or relative to the earth.

By suitably proportioning the arms 54 and 58 of the frame 55 in relation to the shaft or hub 52, the "push" and "pull" forces, as well as the bending forces which are applied to the members of the frame 55 and the spiders thereof are withstood. In the particular embodiment of the invention with which pipes of the size of about 2" pipe size are utilized, the shaft or hub 52 may be of about 4" diameter and about 5 feet long. The arms 54, as shown, may be fastened adjacent the lower end of the shaft 52. Adjacent the center of the length of the shaft 52 the arms 58 are fastened. When the structure of the frame 55, for example, is built of iron the arms 54 and 58 may be welded to the shaft 52 and may be formed of flat iron bars of about 3" to 3½" depth by ⅝" to 1" thickness. The jackscrew may be of about 1½" diameter and cut with six threads per inch and of a form which is usual in jackscrew design. The arms 72 of the third spider 71 may be of material of similar size to the arms 58 and may be welded to the hub 70 and to each other at the point of joining the hub to form a rigid spider.

A modified form of the legs 50 of our support is shown in Figure 5. As will be seen from this figure, within the pipe 50 is inserted a shaft or rod 120 having a bearing surface 122 at the upper end thereof and a bearing surface 123 at the lower end thereof. In some cases, a shaft 120 of uniform diameter from one end to the other thereof may be passed through the pipe. At the lower end of the shaft may be fastened the screw member 110. The pipes 50, therefore, may be clamped rigidly to the spider 71 and the shaft 120 may be turned, as with a wrench applied to the head 124 at the upper end thereof, to screw the screw member 110 into the earth bottom thus to draw the shaft down through the pipe 50. It will be understood that the pipe 50 may be driven part way into the earth bottom or all or nearly all the way, the screw member being screwed into the earth bottom to secure the additional hold after driving the pipes. On the other hand, the shaft 120 may project beyond the pipes 50 and these pipes may reach, for example, down to the earth bottom and provide a guide for the shaft extending beyond the ends of the pipes into the earth to the desired depth. In any case the shaft 120 is so mechanically fitted to pipe 50 as to hold said pipe rigidly and firmly in position when the lower end of the shaft is fixed to the bottom.

Modifications of the construction of the support of our invention may be made within the scope of the invention. As suggested above, the design may be such as to provide for movement of the frame 55 in either direction with respect to the spider 71 which is clamped to the legs, in order to effect the binding or jamming of the legs to transmit thereto the rigidity of the spiders. Moreover, within the scope of our invention, by using suitable jackscrews between the parts, the fixed or clamping spider may be intermediate between two other binding or jamming frames or spiders. Conceivably also, in certain cases, the second spider of the frame, such as that provided by the arms 58 and the clevis pieces 60, may be eliminated and the jamming or binding of the pipes may be effected by motion of a spider such as that provided by the arms 54 and the collars 56 which is movable away from or toward the clamping spider 71. In such case, however, the pipes 50 should be of such size with respect to the free length thereof as to act with the jamming or wedging spider to produce a rigid support, as in such case the forces transmitted to the pipes by the arms 54 may act merely against the bending resistance of the pipes.

While in the drawing and in the above description the invention has been described in connection with an instrument positioned above the water level, the invention is not limited to constructions in which the pipes extend from the ends fixed in the bottom underlying the water to a point above the water level. If, as in some cases is possible, the shield surrounding the instrument, provided, for example, by the float disclosed in our copending application, Serial No. 713,852, filed March 3, 1934, is suitably constructed to prevent the water rising in the opening formed therein, the instrument may be positioned below the water level and a shorter tripod used. Other means may be used in combination with the support of our invention to make possible the setting of the instrument in any desired position with respect to the water level.

In the above description and in the claims the term tripod has been used. By this term is meant a support utilizing three struts or legs, but the term also is intended to include any support which comprises a plurality of such struts or legs cooperating to form a structure of the type in which said struts have their ends resting upon or fixed in or upon the ground or similar base.

In Figure 6 is shown a frame 130 as a modified form of the frame 55. In the construction as in this embodiment of the invention a plurality of members 131, which, in the particular form illustrated, are of angular cross section such as may be provided by angle irons, are positioned in different planes and converge in a common direction. Preferably for the purpose of providing a support for a geophysical instrument, in order that the masses of material may be uniformly distributed with respect to the instrument, these members are positioned in equilateral relationship to each other about a common axis generally like-extending with said members.

At the ends thereof toward which the members converge they may be fastened as by welding to a block 132 of sufficient size rigidly to connect all said members 131 at said end when so welded thereto. The opposite ends of said members are connected by angle braces 134 which may be welded or otherwise fastened to the ends of the angle members 131. The braces 134 are of such size and of such section that they provide a stiff connection between the divergent ends of the angle members 131 and cooperate with the block 132 rigidly to hold the angle members in a predetermined relation to each other and to form the frame 130 as a rigid structure.

It will be noted that the angle members 131 are positioned with respect to each other and to the axis about which they are spaced so that the bend or elbow of the angle is positioned outwardly from said axis. By thus positioning the angles there is presented, to any water moving or flowing by the frame when utilized in connection with suitable struts, as hereafter is described, an edge and surfaces of the member in such relation to said movement that less resistance is presented to the flow of the water and less disturbance and vibration is caused than if the flanges of the angles were positioned outwardly from the axis of the device. Moreover, any movement of the water in the upward or downward direction due to wave action is opposed with less resistance by the angle members when these members are positioned as illustrated in Figure 6 than if these members were arranged with the flanges outwardly.

Welded to or otherwise rigidly fastened to said members 131 are collars 136 which may be formed similarly to the collars 56, as shown in Figure 1. The collars 136 may be provided with funnels 138 for the same purpose and functioning like the funnels 57 of Figure 1. Spaced along the angle members 131 from said collars 136 and rigidly fastened to said angle members 131 are forked members or clevises 140 similar to the clevises 60 of Figure 1. The collars 136 are positioned with the axes of the opening thereof generally like-extending with the angle member 131 to which it is attached. Similarly the forks or clevises 140 are arranged so that the axial dimension thereof is generally like-extending with the member 131 to which it is attached and is substantially in line with the axis of the collar 136 upon the same member 131. Thus, similarly to the construction shown and described in connection with Figure 1, struts such as the pipes 50 may be inserted in and through said collars 136 and said clevises 140. Preferably the collars and clevises are so formed with respect to the struts that said struts when not deformed may be slidably moved therethrough in the axial direction, as described in connection with Figure 1.

In connection with the frame 130 a spider 142 similar to the spider 71 is provided, which has arms 72 extending from a central hub 70 and is provided with the clamping pieces 80, wing nuts 86 and other parts, as described in connection with Figure 1. The spider 142, as in the construction of Figure 1, provides a rigid frame with the arms 72 extending outwardly from the hub 70 and spaced around the axis of said hub 70, preferably in equiangular relationship to each other so that the clamping pieces 80, forming together with the portions 74 of the arms 72 an opening for engagement of the strut or pipe, may be brought substantially into alignment with the axes of the collars 136 and of the clevices 140. It thus will be possible to insert the pipes 50 in position in the collars and clevises and to clamp the upper ends of the pipes to the spider 142 in the manner described in connection with Figure 1.

In the particular embodiments illustrated in Figure 6 through the hub 70 extends the shank 144 of the jackscrew 146. Said hub may have a hole axially therethrough to which the shank 144 is fitted so as to rotate therein. Between the threaded portion of the jackscrew and said hub the jackscrew is provided with a collared portion 148. Also adjacent the upper face of the hub 70 the shank 144 of the jackscrew may be provided with a collar 149 fastened to the shank 144 as by a pin 150. The collars 148 and 149 serve to retain the jackscrew in operating relation to the spider 142. At the upper end of the shank 144 is formed a head upon which may be applied a wrench for turning said jackscrew in the opening in the hub 70. The jackscrew 146 engages the block 132, the threads of the jackscrew fitting into threads formed in said block 132. The threads in the block 132 are cut with the axis thereof coinciding substantially with the axis above referred to about which, preferably symmetrically, the angle members 131 are positioned. Thus, by turning the jackscrew 146 motion of the frame 130 with respect to the spider 142 may be effected.

In utilizing the devices for a support of a geophysical instrument the spider 71 or 142 may be suitably temporarily supported as by passing a bar horizontally underneath two of the arms 72 and supporting said bar, for example, upon the float referred to above and described in said prior application, Serial No. 713,852. Thus the whole weight of the frame 55 or 130 may be temporarily supported by the jackscrew 96 or 146 while the pipes 50 are slidably moved endwise through the openings formed by the portions 74 and 80 of the spider 71 or 142 and through the clevises 60 or 140 and the collars 56 or 136. As said pipes are securely fastened in the earth bottom underneath the water and are clamped by the clamps 80 of the spider 71 or 142 rigidly in relation to each other at their upper ends, the frame 55 or 130 may be moved downward so as to cause the collars 136 to draw the pipes 50 inwardly toward the axis and to deform said pipes into strain and shock resisting form or shape so that in cooperation with the rigid frame 55 or 130 and the rigid spider 71 or 142 a rigid tripod construction is obtained which may be securely and fixedly positioned or fastened in the earth underlying the water and may withstand to a considerable degree shock or forces caused by or concomitant with the motion of the water in which the tripod is positioned.

The invention and that feature thereof according to which the struts or similar elongated members are deformed laterally of their length and held in the laterally deformed shape in order to increase the stiffness of said struts or elongated members, is not limited to its application in the form of a tripod but may be utilized in a structure comprising an elongated member and the means for holding it in said deformed position or shape, wherever and for whatever purposes such a structure may be used.

While in the above description and in the drawing the support of our invention has been described and shown as utilized in water covered areas for the purposes of making geophysical measurements, the invention is not limited to such use and said support may find utility when erected on land. For example, such a support may be utilized on ground which is soft or which is sandy, as on beaches or in sand pits or in similar ground where a solid and secure fixing of the feet of the legs of an ordinary tripod or similar structure may not be possible. In boggy or swampy land not actually covered by water of sufficient depth to be affected by the wind or by current, the support may find equal utility as under the conditions described in the above specification. In some cases also the particular structure of the invention may have advantage when used on relatively solid ground.

All such variations of embodiment and use of the structure, and others which will be apparent to those skilled in the art, are within the scope of the invention.

Having thus described our invention we claim:

1. A support comprising a plurality of pipes inclined to and converging toward each other with at least one of said pipes in a different plane from that of two other pipes, a rigid spider engaging said pipes and provided with collars respectively loosely fitting to each of said pipes, a second rigid spider rigidly connected to but spaced from said first spider in the general direction of the convergence of the pipes, said second spider being provided with means for slidably contacting said pipes, and means for moving said spiders relative to said pipes along a line extending in a direction generally longitudinally of the pipes to cause said collars to bind upon the pipes with a force acting in a direction toward the center of the first spider and to cause said second spider to bind upon the pipes with a force acting away from the center of said second spider.

2. A support comprising a plurality of pipes inclined to and converging toward each other with at least one of said pipes in a different plane from that of two other pipes, a rigid frame engaging said pipes and having portions providing collars respectively loosely fitting to each of said pipes and having at points respectively spaced from said collars in the general direction of the convergence of the pipes means for slidably contacting said pipes, a rigid spider provided with means for rigidly fastening thereto said pipes at points respectively on said pipes removed from said frame, and means connecting between said spider and said frame for moving said frame in a direction generally longitudinally of the pipes to cause said collars to bind upon the pipes with a force acting in a direction toward the center of the frame and to cause said slidable means to bear upon the pipes with a force acting away from the center of the frame.

3. A support comprising a strut, rigid means engaging said strut and formed to hold said strut in predetermined relation thereto, said rigid means also being formed so that said strut may be rotated with respect thereto upon an axis like-extending with the length of the strut, and screw means at one end of said strut arranged upon said axis and of a form capable of being screwed into the earth to hold said end of the strut in fixed relation to the earth.

4. A support comprising a plurality of struts having their lengths generally like-extending, rigid means engaging said struts to hold said struts in spaced relation transversely of their length, said rigid means being formed so that each of said struts may be rotated with respect thereto upon an axis like-extending with its length, and screw means at one end of said struts arranged upon said axis and of a form capable of being screwed into the earth to hold said end of the strut in fixed relation to the earth.

5. A device for bracing the legs of a tripod construction comprising a frame having a plurality of converging rigid elongated members, and means connecting said members and rigidly holding said members in their respective positions in relation to each other, said members each being provided with a part arranged to engage a leg and to resist spreading of the legs and with a part arranged to engage said leg to resist approach of the legs toward each other, for applying a stabilizing force to said legs.

6. A tripod construction according to claim 5 in which the members are of angular section and are positioned with the bend of the angle outwardly of said frame.

7. A device for bracing the legs of a tripod construction comprising a frame having a plurality of converging rigid elongated members, and means connecting said members and rigidly holding said members in their respective positions in relation to each other, said members each being provided with means constructed to hold a leg engaged thereby with the length of the leg substantially like-extending with the length of said member, said means of engagement being so formed with respect to said leg that said leg upon assembly with said device may be moved endwise of itself in relation to said member, said means of engagement for each leg having a part arranged to resist spreading of the legs and a part arranged to resist approach of the legs toward each other for applying a stabilizing force to said legs.

8. A device for bracing the legs of a tripod construction comprising a frame having a plurality of converging rigid elongated members, some of said members being positioned with the lengths thereof in different planes from others of said members, means connecting said members and rigidly holding said members in their respective positions in relation to each other, said members each being provided with means constructed to hold a leg engaged thereby with the length of the leg substantially like-extending with the length of said member, said means of engagement being so formed with respect to said leg that said leg upon assembly with said device may be moved endwise of itself in relation to said member, means constructed and arranged so that it may be rigidly connected to each leg adjacent similarly positioned points on the lengths thereof, and means for moving said frame in relation to said rigid connecting means selectively in the general directions of convergence and divergence of the members, said means of engagement for each leg having a part arranged to resist spreading of said legs and a part spaced therefrom along said elongated member to resist approach of said legs toward each other, whereby a stabilizing force is applied to said legs.

9. A support comprising a plurality of struts, a frame providing a plurality of spaced rigid members rigidly connected together in the frame, at least one of said rigid members engaging each of said struts so as to position said struts with their lengths extending generally in the direction of the spacing of said rigid members but with surfaces upon different struts inclined with respect to each other, at least one of said rigid members being formed with portions for contacting each of said struts upon said surfaces thereof inclined with respect to each other in the different struts, at least one other of said rigid members being formed with portions for contacting each of said struts upon surfaces thereof inclined with respect to each other in the different struts and respectively on opposite sides of said struts from said contacts of said first member, means rigidly connecting said struts at adjacently positioned portions thereof spaced therealong from said frame, and means for moving said frame relative to said struts in said direction of the spacing of the rigid members to cause said members to bear upon the respective inclined surfaces of said struts and to bind said struts to said frame to form a rigid support.

10. A support comprising at least three struts of resilient material, means for positioning said struts in positions inclined to each other and converging toward each other in the same direction, at least one of said struts being positioned in a different plane from that common to two other struts, said means including a rigid member contacting each of said struts at a plurality of points spaced along said strut and on opposite sides thereof and constructed at each strut so that the strut when undeflected may be moved lengthwise of itself while maintaining said strut in its inclined position with respect to the other struts, a second rigid member engaging each of said struts at a place spaced therealong from the points of contact of said first rigid member, said second rigid member being constructed removably to bind said struts at said places of its engagement therewith to hold said struts rigidly against movement with respect to each other, and means connecting between said two rigid members for moving said first member with respect to the second member in the general direction of the spacing of said members to cause said first member by virtue of the inclination of said struts to bear upon said struts at the points of contact therewith of said first member to stress said struts transversely of their lengths into a deflected form acting with said rigid members to form a rigid support.

11. A tripod according to claim 10 in which said second rigid member is provided with clamps constructed for easy removal from clamping contact with the struts to permit the struts to be slidably passed through the openings in the frame.

12. A support comprising a plurality of struts of resilient material, said struts having their lengths extending in the same general direction and being in spaced relation to each other transversely of said lengths, rigid means engaging said struts near one end of each strut for connecting together said struts, and adjustable means having two points of contact with each of said struts, said adjustable means being so constructed and arranged as to provide for bowing said struts when moved in one direction, thereby forming a stable support.

13. A support comprising a plurality of struts of resilient material, said struts having their lengths extending in the same general direction and being in spaced relation to each other transversely of said lengths, and means engaging each of said struts at a plurality of spaced points on each strut, said means being constructed and arranged for rigidly connecting said struts together at adjacently positioned portions of the different struts and also so as to resist spreading of the struts at places which are similarly positioned on the different struts and to resist approach of the struts at other places which are similarly positioned on said struts spaced from said first mentioned places so as to hold said struts bowed in their lengths to provide a stable support.

14. A support comprising a plurality of struts of resilient material, said struts having their lengths extending in the same general direction and being in spaced relation to each other transversely of said lengths, means engaging each of said struts at adjacently positioned portions of the different struts to rigidly connect said struts together, and rigid means adjustably movable longitudinally of the struts with respect to said rigid connecting means and so contacting each of said struts at a plurality of spaced places thereon as to resist spreading of the struts at some of said places and to resist approach of the struts at others of said places, whereby said struts become bowed in their lengths to form with said rigid connecting means a stable support.

15. A support comprising a plurality of struts of resilient material, a rigid member engaging each of said struts so as to position said struts with their lengths extending in the same general direction but so that surfaces on different struts are inclined with respect to each other, said rigid member being formed to contact said inclined surfaces at a plurality of places on each strut spaced therealong, some of said spaced places on each strut being at the opposite side of the strut from others of said places, means engaging said struts at adjacently positioned portions of the different struts and rigidly connecting said struts together, and means for moving said rigid member and said rigid connecting means relative to each other along a line extending in said general direction to cause said rigid member bearing on said inclined surfaces to deflect and to hold said struts to a bowed form.

16. A support comprising a strut of resilient material, rigid means engaging said strut at two places spaced along said strut and contacting said strut on opposite sides thereof, rigid means rigidly connected to said strut at a third place spaced along said strut from said first mentioned places of engagement, and means for moving said two rigid means relative to each other on a line at an angle to the length of said strut and constructed and arranged with respect to said two rigid means to hold said two means in said alignment so as to deflect said strut transversely of its length into a bowed form.

17. A device for bracing the legs of a tripod construction comprising a rigid member constructed with parts for engaging each leg of the tripod at least at two places and so as to resist spreading of the legs at one of said places and to resist approach of the legs toward each other at the other place, a second rigid member constructed so that it may be rigidly connected to each leg to hold the legs rigidly with respect to each other, and means for moving said rigid members relative to each other longitudinally of the legs, the parts which are for engagement of the legs respectively at one of said places being spaced transversely of the legs a greater distance than the spacing of the parts which are for engagement of the legs respectively at at least one other place thereon, whereby the parts for engaging the legs at the shorter spacing may act as a fulcrum for bowing the legs.

18. A support for a geophysical instrument comprising a plurality of struts each having one end thereof fixed with respect to the earth's surface and extending upwardly from said end, said struts being spaced in relation to each other transversely of said lengths and being so positioned that each strut has a surface thereof inclined lengthwise of the strut with respect to at least one other strut, rigid means rigidly connected to each strut at a point spaced therealong from its fixed end, and rigid means adjustably movable lengthwise of the struts and engaging each of said struts upon the respective surfaces thereof which are inclined to each other in the different struts to cause said struts to become bowed so as to form with said rigid connecting means and said rigid movable means a stable support.

FRANZ JULIUS GERHARD NEUMANN.
WERNER RUDOLF HAUBOLD.